3,235,567
ARSENIC-PHOSPHORUS COMPOUNDS

George A. Richardson and Gail H. Birum, Dayton, Ohio, assignors to Monsanto Company, a corporation of Delaware
No Drawing. Filed Mar. 31, 1960, Ser. No. 18,843
17 Claims. (Cl. 260—347.8)

The present invention relates to new compounds containing both arsenic and phosphorus. More particularly, this invention relates to phosphorus-containing esters of trivalent arsenic acids.

It is an object of this invention to provide new and useful organoarsenic compounds containing phosphinylhydrocarbyloxy radicals. It is a further object of this invention to provide methods of making organoarsenic compounds containing phosphinylhydrocarbyloxy radicals. These and other objects will become apparent as the description of the invention progresses below.

In general, this invention is directed to esters of trivalent arsenic acids and alpha-hydroxyhydrocarbyl pentavalent phosphorus esters. These compounds having from one to three halogen atoms selected from the group consisting of bromine and chlorine attached to the arsenic atom, an aldehyde, and a trivalent phosphorus ester having at least one alkoxy or haloalkoxy radical attached to the phosphorus atom. During the course of this reaction the trivalent phosphorus atom of the phosphorus ester is converted to the pentavalent state, gives up an alkyl or haloalkyl radical and becomes attached to the carbonyl carbon atom of the aldehyde, thus forming a phosphinylhydrocarbyloxy radical which replaces a bromine or chlorine or chlorine atom attached to the arsenic atom. The alkyl radical given up by the trivalent phosphorus ester and the bromine or chlorine atom given up by the arsenic compound form an alkyl or haloalkyl bromide or chloride compound by-product. Alternatively, the compounds of this invention may be prepared by reacting the trivalent arsenic compound containing at least one bromide or chloride atom with an alpha-hydroxyhydrocarbyl phosphorus ester in the presence of a basic material.

Compounds within the scope of this invention are those having a generic formula selected from the group consisting of $$R_n-As[OCH-\underset{\underset{A}{|}}{\overset{\overset{O}{\|}}{P}}-A]_x$$
$$\underset{X_m}{|}\quad \underset{Y}{|}$$

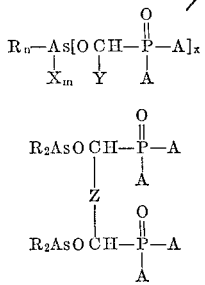

and

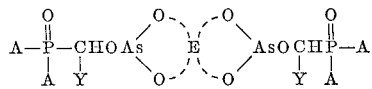

where $n$ is a whole number of from 0 to 2, $m$ is a whole number of from 0 to 2, $x$ is a whole number of from 1 to 3, and the sum total of $n+m+x$ is always to equal 3; X is selected from the group consisting of bromine and chlorine; each R is selected from the group consisting of hydrogen, hydrocarbyl, hydrocarbyloxy and hydrocarbylthio radicals having from 1 to 20 carbon atoms, and said radicals having halogen substituents therein, two R's taken together are satisfied by a member of the group consisting of (a) a bivalent -hydrocarbylene- radical having from 4 to 12 carbon atoms and completing with the arsenic atom a ring having from 4 to 6 carbon atoms, (b) a bivalent —O-hydrocarbylene-O— radical having from 2 to 12 carbon atoms and completing with the arsenic atom a ring having from 2 to 4 carbon atoms; Y is selected from the group consisting of hydrogen, hydrocarbyl radicals having from 1 to 17 carbon atoms, furyl, thienyl and said radicals having as a substituent therein a member of the group consisting of halogen, -cyano, -alkyl, —O-alkyl, —S-alkyl, —COOalkyl where alkyl has from 1 to 5 carbon atoms when $x$ is 1, and when $x$ is 2 to 3, Y is selected from the group consisting of hydrocarbyl radicals having from 1 to 11 carbon atoms, furyl, thienyl, and said radicals having a substituent selected from the group consisting of halogen, -cyano, -alkyl, —O-alkyl, —S-alkyl, and —COOalkyl where alkyl has from 1 to 5 carbon atoms; Z is a bivalent -hydrocarbylene- radical having from 1 to 18 carbon atoms; each A is selected from the group consisting of hydrocarbyl and hydrocarbyloxy radicals having from 1 to 12 carbon atoms, and said radicals having halogen substituents therein; and E contains only the elements carbon and hydrogen and is the remainder of a heterocyclic trivalent arsenic compound.

The phosphinylhydrocarbyloxy portion of the compounds of this invention constitutes that portion of the compounds represented by the structure

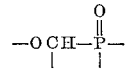

wherein the indicated free valences of the carbon and phosphorus atoms are satisfied as described above.

According to one method of this invention, trivalent arsenic compounds containing from one to three phosphinylhydrocarbyloxy radicals attached to the arsenic atom can be prepared by reacting a trivalent arsenic compound which is not subject to self-condensation and which has attached to the arsenic atom from one to three bromine or chlorine atoms, or mixtures thereof, with an aldehyde and a trivalent phosphorus ester having at least one alkoxy or haloalkoxy radical attached to the phosphorus atom thereof, the remaining phosphorus valences being satisfied by a hydrocarbyl radical, a hydrocarbyloxy radical, a halohydrocarbyl, or a halohydrocarbyloxy radical, preferably having from 1 to 12 carbons, although such radicals of higher carbon content, say, up to 20 carbons may also be used if desired.

More specifically the method comprises reacting a trivalent arsenic compound having a generic formula selected from the group consisting of

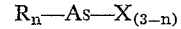

and

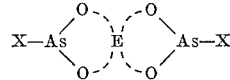

wherein $n$ is a whole number of from 0 to 2; X is selected from the group consisting of bromine and chlorine, and mixtures thereof; R is selected from the group consisting of hydrogen, hydrocarbyl, hydrocarbyloxy, hydrocarbylthio radicals having from 1 to 20 carbon atoms, and said radicals having halogen substituents therein, two R's taken together are satisfied by a member of the group consisting of (a) a bivalent -hydrocarbylene- radical having 4 to 12 carbon atoms and completing with the arsenic atom a ring having from 4 to 6 carbon atoms, (b) a bivalent —O-hydrocarbylene-O— radical having from 2 to 12 carbon atoms and completing with the arsenic atom a ring having from 2 to 4 carbon atoms; and E is the remainder of a heterocyclic trivalent arsenic spiro compound, containing from 1 to 5 carbon atoms with an aldehyde having a generic formula selected from the group consisting of $$Y\text{---}CHO \text{ and } OHC\text{---}Z\text{---}CHO$$

wherein Y is selected from the group consisting of hydrogen, hydrocarbyl radicals having from 1 to 17 carbon atoms, furyl, thienyl, and said radicals having as a substituent therein a member of the group consisting of halogen, -cyano, -alkyl, —O-alkyl, —S-alkyl, and —COOalkyl, where alkyl has from 1 to 5 carbon atoms, and Z is a bivalent -hydrocarbylene- radical having from 1 to 18 carbon atoms; and a trivalent phosphorus ester having the generic formula $$A_2POT$$

wherein each A is selected from the group consisting of hydrocarbyl radicals, hydrocarbyloxy radicals having from 1 to 12 carbon atoms, and such radicals having halogen as a substituent therein, and T is selected from the group consisting of alkyl and haloalkyl radicals having from 1 to 12 carbon atoms.

The preferred method for preparing the compounds of this invention involves the reaction of a trivalent arsenic compound having from one to three bromine or chlorine atoms attached to the arsenic atom, an aldehyde, and a trivalent phosphorus ester which has at least one alkoxy or haloalkoxy group linked to the phosphorus atom. The product obtained will depend upon the molar proportions of the reactants used, i.e., the number of phosphinylhydrocarbyloxy radicals present in the compounds of this invention depends upon the number of halogen atoms which are displaced from the arsenic atom in the halogen-containing arsenic reactant. When only one halogen thus attached is replaced, a product containing one phosphinylhydrocarbyloxy group is obtained, for example, as follows:

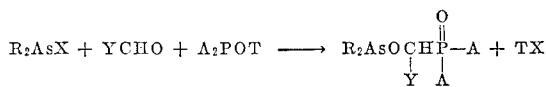

wherein R, X, Y, and A are as defined above and T is selected from the group consisting of alkyl and haloalkyl radicals having from 1 to 12 carbon atoms.

When two halogen atoms are attached to the arsenic atom, they can both be replaced by using two moles each of the carbonyl compound and trivalent phosphorus ester. Thus, the reaction may be:

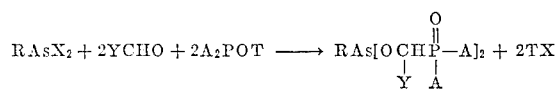

wherein the product has two phosphinylhydrocarbyloxy groups; or by using only one molar proportion each of aldehyde and trivalent phosphorus ester the reaction may be as follows:

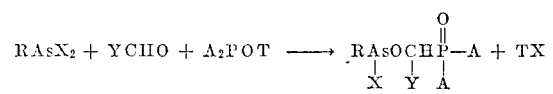

wherein the product contains one halogen atom attached to the arsenic atom and one phosphinylhydrocarbyloxy group. When three halogen atoms are attached to the arsenic atom, all three may react as follows:

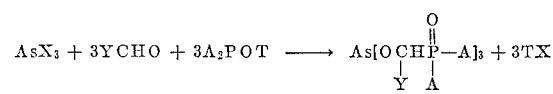

where the product contains three phosphinylhydrocarbyloxy groups; or the reaction may be limited to replacement of two halogen atoms,

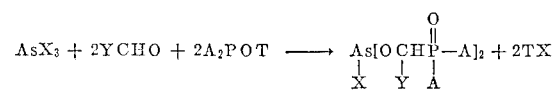

to give a product containing one halogen atom attached to the arsenic atom and two phosphinylhydrocarbyloxy groups; or to replacement of one halogen atom,

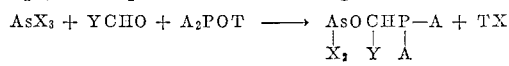

to give a product containing two halogen atoms attached to the arsenic atom and one phosphinylhydrocarbyloxy group, each reaction being accomplished by controlling the molar proportion of aldehyde and trivalent phosphorus ester that are used to displace the halogen atom from the arsenic atom.

It is also within the scope of this invention to replace each halogen in the arsenic trihalide or arsenic dihalide reactant with a different phosphinylhydrocarbyloxy radical by replacing the halogens, one at a time, with a different aldehyde and trivalent phosphorus ester. Thus by following the route indicated in the above paragraph for replacing one halogen atom by reacting one mole of aldehyde and one mole of trivalent phosphorus ester with one mole of, say, an arsenic trihalide and then adding one mole each of a different aldehyde and trivalent phosphorus ester for each halogen to be replaced, the reaction products can be varied extensively. For example by reacting arsenic trichloride first with one mole each of acetaldehyde and triethyl phosphite until reaction is complete, then with one mole each of propionaldehyde and diethyl ethylphosphonite until reaction is complete and finally with one mole each of butyraldehyde and ethyl diethylphosphinite, there is produced 1-(diethoxyphosphinyl)ethyl 1-(ethylethoxyphosphinyl)propyl 1 - (diethylphosphinyl)butyl arsenite.

Among the arsenic halide reactants that can be used in this invention are compounds of the following general formulae:

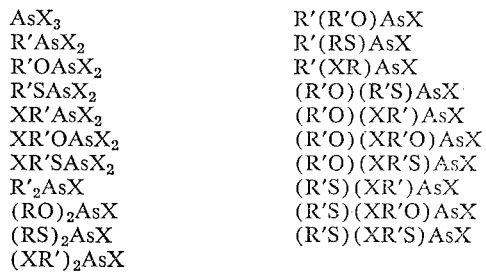

where R' represents a hydrocarbyl radical of from 1 to 20 carbon atoms, XR' represents a halohydrocarbyl radical of from 1 to 20 carbon atoms, and X represents chlorine or bromine. The hydrocarbyl radicals may be aliphatic or aromatic; they may be saturated or unsaturated, and are preferably those having from 1 to 12 carbon atoms. Examples of hydrocarbyl and halohydrocarbyl radicals included in the above definition are alkyl, alkenyl, alkynyl, cycloalkyl, aryl, alkaryl, aralkyl, and their halogen derivatives. The above list of arsenic halide reactants is not exhaustive of all variations but is intended only to show how the arsenic valences may be satisfied for use in this invention.

Examples of arsenic trihalides, $AsX_3$, that can be used in the present invention are, of course, arsenic trichloride, arsenic tribromide, and the mixed arsenic bromochlorides.

Examples of compounds of the formula $RAsX_2$ which are useful in this invention are dibromo- and dichloroarsines and any of the following: methyl-, ethyl-, n-propyl-, isopropyl-, n-butyl-, isobutyl-, amyl-, isoamyl-, n-hexyl-, n-heptyl-, decyl-, undecyl-, dodecyl-, triisobutylenyl-, 2-ethylhexyl-, 4-methyloctyl-, tetradecyl-, eicosyl-, propenyl-, hexenyl-, vinyl-, allyl-, 4-heptenyl-, octadecenyl-, propynyl-, heptynyl-, decynyl-, cyclopentyl-, cyclohexyl-, cycloheptyl-, phenyl-, 4-ethylphenyl-, 4-heptenyloxyphenyldibromo- and -dichloroarsines, and dibromo- and dichloroarsines having such radicals, carrying halogen substituents.

Examples of the presently useful hydrocarbyloxy and halohydrocarbyloxy dihaloarsines are, e.g. methoxy-, ethoxy-, propoxy-, isopropoxy-, allyloxy-, propynyloxy-, n-butoxy-, tert-butoxy-, 2-butenyloxy-, amyloxy-, isoamyloxy-, n-hexyloxy-, 5-hexenyloxy-, n-heptyloxy-, n-heptynyloxy-, 2-ethylhexyloxy-, isononyloxy-, n-undecyloxy-, n-dodecyloxy-, 11-dodecenyloxy-, 4-hexadecenyloxy-, 2-chloroethoxy-, 5-chloro-2-pentynyloxy-, 2-fluoroethoxy-, tetrachlorobutoxy-, tribromopropoxy-, 2-iodopropoxy-, dibromododecenyloxy-, 18-chloroeicosyloxy-, 2-chlorophenoxy-, 4-bromophenoxy-, 2,4-dichlorophenoxy-, 2-chloro-p-tolyloxy-, cyclohexyloxy-, cyclopentyloxy-, 4-bromocycloheptyloxy-, 4-methoxyphenoxy-, p-pentylphenyloxy-, α-naphthyloxydichloro- and -dibromoarsines.

Compounds of the formulae R'SAsX and XR'SAsX$_2$ are hydrocarbylthiodihaloarsines and halohydrocarbylthiodihaloarsines in which the hydrocarbyl group is as defined above. Such compounds are for example, the alkylthio-, alkenylthio- and alkynylthiodihaloarsines such as methylthio-, ethylthio-, 2-pentenylthio-, 4-octynylthio-, eicosylthio-, n-butylthio-, cyclohexylthiodibromo- and -dichloroarsines. Examples of aromatic hydrocarbylthio and halohydrocarbylthiodibromo- and -dichloroarsines are, e.g., phenylthio-, p-tolylthio-, benzylthio-, 2-naphthylthio-, 4-ethylphenylthio-, 2,4,6-trimethylphenylthio-, 4-iodobenzylthiodibromo- and -dichloroarsines.

Compounds of the formulae R'$_2$AsX, R'(R'O)AsX, R'(R'S)AsX, (R'O)$_2$AsX, (R'S)AsX, (R'S)(R'O)AsX and the halogen substituted derivatives thereof in which R' is as defined above in detail for compounds of the formulae R'AsX$_2$, R'OAsX$_2$, and R'SAsX$_2$ may also be used in this invention. A few examples of aliphatic haloarsines and dihydrocarbyloxyhaloarsines which are suited for the present purpose are:

| | |
|---|---|
| (Alkyl)$_2$AsX | (Alkyl-O—)$_2$AsX |
| (Alkenyl)$_2$AsX | (Alkenyl-O—)$_2$AsX |
| (Alkynyl)$_2$AsX | (Alkynyl-O—)$_2$AsX | in which alkyl, alkenyl, and alkynyl radicals have from 1 to 12 carbon atoms and Z is chlorine or bromine. For example, dimethyl-, diethyl-, diisopropyl-, di-n-butyl-, dimethoxy-, diethoxy-, diisopropoxy-, di(2-propynyloxy)-, di-tert-butyl-, di-n-amyl-, diisoamyl-, di-tert-butoxy-, di-n-amyloxy-, diisoamyloxy-, di-n-hexyl-, bis(2-hexenyl)-, di-n-heptyloxy-, bis(2-ethylhexyloxy)-, di-n-octyl-, diisononyl-, di-n-octyloxy-, di-n-decyl-, di-n-undecyl-, di-n-dodecyl-, dinonadecyl-, di-n-decyloxy-, bis(3-ethyl-n-undecyloxy)-chloro- and -bromoarsines and the mixed esters such as propylbutoxychloroarsines, ethoxymethoxybromoarsine, hexyl-hexyloxychloroarsine, 3-butenyloxyhexyloxybromoarsine, etc., may be used.

The aliphatic radical from the dialkyl-, dialkoxy-, dialkenyl-, dialkenyloxy-, dialkynyl-, and dialkynyloxychloro- and -bromoarsines may contain one or more halogen atoms. Examples of such compounds are the simple esters such as bis(bromomethyl)-, bis(2-chloropropyl)-, bis(2-chloroethoxy)-, bis(2-bromobutyl)-, bis(6-chloro-2-hexenyl)-, bis(2-chloroheptyl)-, bis(4,4-dichlorooctyloxy)chloro- and -bromoarsines and the mixed esters of both paraffinic and haloparaffinic alcohols such as (3-chloropropyl)ethylbromoarsine, (2-chloroethoxy)methoxychloroarsine, (4,10-dichloroeicosyl)butylchloroarsine, and (2-chloropropoxy)ethylbromoarsine.

Other compounds that may be used as the arsenic halide reactants are those resulting from the reaction of a saturated oxirane or glycidyl ether compound with an arsenic trihalide compound. For example, as by the following equation:

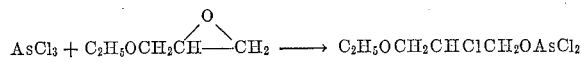

Oxirane compounds suitable for reaction with arsenic trichloride or arsenic tribromide to yield the halohydrocarbyloxydichloro- or -dibromoarsine reactants are e.g., ethylene oxide and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyheptane, 2,3-epoxy-3-ethylpentane, 1,2-epoxy-4-methylpentane, 1,2-epoxy-2,4,4-trimethylpentane, 10,11-epoxydodecane, haloalkyl-substituted oxiranes such as epichlorohydrin, epibromohydrin, epiiodohydrin, epifluorohydrin, 1,2-epoxy-4-bromobutane, 2,3-epoxy-4-chlorobutane, 2,3-epoxy-1-bromopentane, 3,4-epoxy-2-chlorohexane, 1-bromo-2,3-epoxyheptane, 10-chloro-14,15-eicosane; the alkenyl-substituted oxiranes such as 3,4-epoxy-4-methyl-1-pentene, and 3,4-epoxy-1-butene; aryl-substituted oxiranes such as epoxyethylbenzene, (1,2-epoxy-1-methylethyl)benzene, (3-chloro-1,2-epoxypropyl)benzene and (1,2-epoxypropyl)benzene; alkoxyalkyl- and phenoxyalkyl-substituted oxiranes such as the methyl, ethyl, isopropyl, isobutyl, isoamyl, phenyl and 2-ethoxyethyl ethers of glycidol, i.e., compounds of the formula

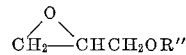

where R" is a methyl, ethyl, isopropyl, amyl, phenyl or 2-ethoxyethyl radical. The epoxides used can also contain substituent groups therein such as alkoxy, carboalkoxy, amyloxy, alkylmercapto, arylmercapto, cyano, halogen, etc.

Since reaction of the oxirane compound with the arsenic trihalide proceeds through opening of the oxirane ring, there may be present in the reaction mixture minor amounts of isomeric halohydrocarbyloxychloroarsine compounds; e.g., while in the reaction of arsenic trichloride or arsenic tribromide and propylene oxide the oxirane ring opens with preferential formation of 2-chloropropoxydichloroarsine or bis(2-chloropropoxy)chloroarsine, depending upon the molar proportions used, there may also be formed small quantities of 1-methyl-2-chloroethoxydichloroarsine or bis(1-methyl-2-chloroethoxy)chloroarsine, respectively. The isomer content is of no consequence for the present purpose because the isomers also react with aldehydes and trivalent phosphorus esters to give the compounds of this invention. While the small quantity of isomeric compounds present in the final reaction product may be considered to constitute an impurity, it is not detrimental in practical application for the isomers are so closely related that they possess substantially the same utility. Thus the content of, say, a small quantity of the di(1-methyl-2-chloroethoxy)chloroarsine in admixture with bis(2-chloropropoxy)chloroarsine does not limit the utility of the product obtained when the latter compound is reacted with an aldehyde and a trivalent phosphorus ester. However, if desired, the isomeric impurity may be separated by generally known isolating procedures, e.g., chromatography, crystallization, etc. Reaction of the arsenic trichloride or arsenic tribromide with the presently useful oxirane compounds takes place readily, generally by simply mixing the arsenic halide with the oxirane compound in substantially equimolar proportion if one halogen atom is to be reacted; or with substantially two moles of the oxirane compound if two halogens are to be reacted. Depending on the nature of the individual reactants, heating may or may not be required. The addition of catalytic amounts of acids may be beneficial. Usually the reaction is exothermic, whereby cooling in order to maintain smooth reaction is advantageous. It is recommended that in such exothermic reactions the temperature be not allowed to rise above, say, from 60° C. to 80° C. An inert diluent may be employed but is usually unnecessary. Since the reaction between the arsenic trihalide and the oxirane compound involves a straight addition reaction, no isolation procedure is required before reaction with the aldehyde and the trivalent phosphorus ester. The end of the reaction between the arsenic halide and the oxirane compound can easily be determined, e.g., by noting cessation of change in refractive index, or of heat evolution in the case of exothermic reaction, or of change of viscosity of the reaction mass.

Halogenated carbon-arsenic ring compounds, i.e., those having a bromine or chlorine atom attached to an arsenic atom of the ring, may also be used to prepare compounds of this invention. Halogenated arsenidine, arsenolidine, and arsenole compounds which can be used are, e.g., 1-chloroarsenidine, 1-bromo-4,5-dimethylarsenolidine, 1-chloro-3,4-diethylarsenole, 1-chloro-5-[1-(2-propenyl)] arsenidine, 2-bromo-4-[1-(2-bromopropyl)]arsenole, 1-chloroarsenol, 1-chloro-3-hexylarsenolidine, 1-bromo-4-heptyloxyarsenolidine, etc.

Examples of dioxahaloarsenic compounds that may be used are the 2-halo-1,3,2-dioxarsane and arsolane compounds, e.g., 2-chloro-1,3,2-dioxarsane, 2-bromo-1,3,2-dioxarsolane, 2-chloro-4,4,6-trimethyl-1,3,2-dioxarsane, 2-bromo-4-butyl-1,3,2-dioxarsolane, 1-chloro-4,5-dipropyl-1,3,2-dioxarsane, the pyrocatechol ester of chloroarsinediol, and haloarsenic spiro compounds such as 3,9-dichloro-3,9-diarsena-1,3,5,10-tetroxaspiro[5.5]hendecane, 2,6-dibromo-2,6-diarsena-1,3,5,7-tetroxaspiro[3.3]heptane, 3,9-dichloro - 1,5,7,11 - tetramethyl-2,4,8,10-tetroxaspiro[5.5] hendecane, etc. Other haloarsenic cyclic compounds that can be used are such compounds as 2-chloro-1,3,2-benzodioxarsenole, 1-chloro-2,1-benzoxarsenole and 1-chlorobenzarsenole. The nomenclature of the ring compounds of arsenic is derived from that used in The Ring Index, by Patterson, Austin M., et al., Reinhold Publishing Corp., copyright 1940.

A class of aromatic arsenic halides which are the benzenoid dihydrocarbyloxyhaloarsines, i.e. compounds of the formula (ArO)₂AsX in which Ar is a benzenoid hydrocarbyl radical which contains from 6 to 12 carbon atoms and X is chlorine or bromine. Such compounds may be diaryloxy-, bis(alkaryloxy)-, bis(aralkyloxy)-, aryloxyalkaryloxy-, aryloxyaralkyloxy-, alkaryloxyaralkyloxybromo- or -chloroarsines, e.g. diphenoxy-, di-p-tolyloxy-, di-α-or-β-naphthyloxy-, dibiphenyloxy-, dimesityloxy-, dicumyloxy-, bis(2-butylphenoxy)-, phenoxy-2-naphthyloxy-, biphenyloxyphenoxy-, (4-ethylphenoxy)phenoxy-, dibenzyloxy-, (2-ethylphenoxy)benzyloxy-, benzyloxyphenoxy-, biphenyloxy-, bis(4-ethylbenzyloxy)-, (3-phenylpropoxy)mesityloxy, or β-naphthyloxyphenoxychloro- or -bromoarsines.

The corresponding benzenoid hydrocarbylthiodihaloarsines, i.e., compounds of the formulae ArSAsX₂ and (ArS)₂AsX wherein Ar and X are as defined above, are similarly valuable for the present purpose. Such compounds are, for example, bis(phenylthio)chloroarsine, bis(benzylthio) bromoarsine, bis(β-naphthylthio)chloroarsine, biphenylthio(phenylthio)chloroarsine, benzylthio(α-naphthylmethylthio)bromoarsine, (p - tolylthio)-2-phenylethylthiobromo- and -chloroarsines, etc.

Mixed hydrocarbylhaloarsines and halohydrocarbylthiohaloarsines are, likewise, useful in the present invention. Such compounds are, for example, methylphenylchloroarsine, (2-propenyl)-p-tolylchloroarsine, (2-chloroethyl)-β-naphthylbromoarsine, (benzylthio)ethylthiobromoarsine, (2-chlorophenyl)-4-butynyldichloroarsine, (n-butyl)cyclohexylthiochloroarsine, (2-ethylhexyl)-2,3-dichlorophenylthiochloroarsine, etc.

Examples of hydrocarbylhydrocarbyloxyhaloarsines, i.e., compounds of the formula R′(R′O)AsX are the following: ethylethoxychloroarsine, dodecyldodecyloxybromoarsine, vinylpropoxybromoarsine, phenylhexyloxychloroarsine, mesitylphenoxychloroarsine, (3-butynyl)-4-pentenylchloroarsine, cyclohexylethoxybromoarsine, 1-butoxycyclohexylchloroarsine, and α-naphthylpropynyloxychloroarsine. These compounds may have halogen substituted in one or both hydrocarbyl groups. For example, (2,2-dichloropropyl)-2-chloro-4-pentynyloxychloroarsine, 8-chlorotetradecyl-8-chlorotetradecyloxychloroarsine, and (2-bromonaphthyl)-2,4,6-tribromophenoxybromoarsine, etc., may be used.

Also presently useful are the hydrocarbyloxyhydrocarbylthiohaloarsines, i.e., compounds of the formula

where X and R′ are as defined above. Such compounds are, for example, phenoxyphenylthio-, propenoxybutynylthio-, methoxyphenylthio-, β-naphthyloxy-β-naphthylthio-, ethoxyethylthio-, m-tolyloxy-m-tolylthio-, 4-chlorophenoxybiphenylthio-, 2-methyl-α-naphthyloxyphenylthio-, α-naphthylmethoxyphenylthio-, heptyloxy(3-cyclohexenylthio)-, or butoxy-p-cumylthiochloro- or -bromoarsines.

A very valuable class of haloarsines useful in this invention are the dibromo- and dichloroarsines which term includes the hydrocarbyl, hydrocarbyloxy, and hydrocarbylthiodibromo- and -dichloroarsines and their halogen substitution products as well as the compounds dibromoarsine, (Br₂AsH), and dichloroarsine, (Cl₂AsH). Examples of such compounds are ethyldibromoarsine, phenyldichloroarsine, 2-chloropropyldichloroarsine, hexyloxydibromoarsine, 2,4-dibromobenzyloxydichloroarsine, decylthiodichloroarsine, 2-butenyldichloroarsine, 6-chloro-4-hexenyldibromoarsine, 2-ethyl-4-octenyloxydichloroarsine, 4-(2-chlorovinyl)phenoxydibromoarsine, 3-hexynyloxydichloroarsine, etc.

Any of the above described types of arsenic halide compounds can be reacted with an aldehyde and a trivalent phosphorus ester which has at least one alkoxy or haloalkoxy group linked to the phosphorus atom to give phosphorus-containing esters of arsenic compounds. In general, aldehydes having from 1 to 18 carbon atoms are used. However, the aldehydes are usually selected so as to minimize possible steric hindrance in the compound being prepared. Hence while aldehyde compounds having up to 18 carbon atoms may be used, it is preferred to limit the number of carbon atoms in the aldehyde reactant to 12 carbon atoms when three halogen atoms of the arsenic halide reactant are to be replaced. When only one or two halogen atoms of the arsenic halide reactant are to be replaced, aldehyde compounds having up to 18 carbon atoms can be used.

Owing to their easy availability, a particularly useful class of aldehydes includes the aliphatic aldehydes of from 1 to 18 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, decanal, undecanal, 2-methylundecanal, lauraldehyde, myristaldehyde, palmitaldehyde, stearaldehyde, etc.

The presence of cyano, halogen, alkoxy, carboalkoxy, and alkylthio substituents in the aldehyde has no effect on the course of the reaction; hence, there may be employed such substituted aldehydes as 3-cyanopropionaldehyde, chloroacetaldehyde, 3-butoxybutyraldehyde, 4-cyano - 2,2 - dimethylbutyraldehyde, 2,3-dichloropropionaldehyde, 3 - isopropoxypropionaldehyde, 3 - (ethylthio)-3 - methylbutyraldehyde, 2 - methyl - 3 - fluoropropionaldehyde, dichlorolauraldehyde, ethyl - 11 - formylundecanoate, succinaldehydic acid methyl ester, ethyl-4-formylbutyrate, iodoacetaldehyde, dichloroacetaldehyde, chloral, etc.

Presently useful alicyclic carboxaldehydes include cyclohexenecarboxaldehyde, 6 - methyl - 3 - cyclohexenecarboxaldehyde, 2 - cyclohexene - 1 - carboxaldehyde, cyclopentanecarboxaldehyde, 3 - isopropyl - 1 methylcyclohexanecarboxaldehyde, 5 - ethoxy - 2 - cyclopentene-1 - carboxaldehyde, 1 - bromo - 2,2,6-trimethylcyclohexanecarboxaldehyde, 2,2,6 - trimethyl - 2 - cyclohexenecarboxaldehyde, 2,6 - diethyl - 2 - cyclohexenecarboxaldehyde, etc.

Examples of unsaturated aliphatic and aromatic aldehydes which may be used in this invention are acrolein, methylacrolein, crotonaldehyde, cinnamaldehyde, and undecenaldehyde.

The presently useful benzenoid aldehydes may be aliphatic-aromatic or purely aromatic aldehydes which may or may not be further substituted, e.g., benzaldehyde, o-, m-, p-tolualdehyde, phenylacetaldehyde, 1- or 2-naphthylaldehyde, biphenyl - 4 - carboxaldehyde, hydrocinnamaldehyde, 2,3 - dichlorobenzaldehyde, 4-formylacetanilide, piperonal, 2-, 3-, or 4-butoxybenzaldehyde, p-ethoxybenzaldehyde, 3,4-dipropoxybenzaldehyde, 4-(n-butylthio)benzaldehyde, o-, m-, or p-iodobenzaldehyde, 3,4- or 3,5-dibromobenzaldehyde, 5-tert-butyl-m-tolualdehyde, 2 - p - cymenecarboxaldehyde, 6 - methoxy-2 - naphthaldehyde, biphenylcarboxaldehyde, 6 - methoxy-3-biphenylcarboxaldehyde, etc.

The presently useful aldehyde may also be a heterocyclic aldehyde such as 2- or 3-furaldehyde, 5-acetamido-2 - furaldehyde, 2- or 3 - thiophenecarboxaldehyde, 3,5 - dimethyl - 2 - thiophenecarboxaldehyde, 2,5 - dichloro - 3 - thiophenecarboxaldehyde, 2,5 - diethyl - 3 - thiophenecarboxaldehyde, etc.

When polyaldehyde compounds are used, it is preferred to limit the number of halogen atoms replaced from the arsenic halide reactant to one to avoid steric hinderance problems. For example the reaction of 2 moles of arsenic halide reactant, one mole of a dialdehyde compound, and 2 moles of a trivalent phosphorus ester proceeds as follows:

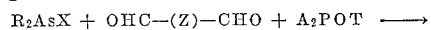

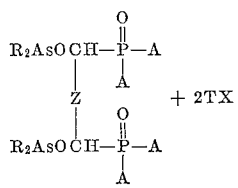

Examples of aliphatic dialdehyde compounds that may be used are saturated dialdehydes such as malonaldehyde, succinaldehyde, isosuccinaldehyde, glutaraldehyde, dimethylmalonaldehyde, ethylmalonaldehyde, methylsuccinaldehyde, adipaldehyde, pimelaldehyde, suberaldehyde (octanedialdehyde), isopropylglutaraldehyde, azalaic(nonanedialdehyde), 3-propyladipaldehyde, sebacaldehyde (decanedialdehyde), hendecanedialdehyde, dodecanedialdehyde, brassylaldehyde(tridecanedialdehyde), pentanedialdehyde, hexadecanedialdehyde, octadecandialdehyde, eicosanedialdehyde. Examples of aliphatic unsaturated dialdehydes that may be used are malealdehyde, fumaraldehyde, citraconaldehyde, itaconaldehyde, mesaconaldehyde, and cis- and trans-pententenedialdehyde, etc.

Aromatic dialdehydes may also be used, a few examples of which are phthalaldehyde, isophthalaldehyde, terephthalaldehyde, naphthalenedicarboxaldehyde, diphenyl - o,o' - dialdehyde, p - [1 - (2 - formylethyl)] benzaldehyde, 2,4 - pyrroledialdehyde, p - [1 - (5-formylpentyl)]benzaldehyde, etc. Dialdehyde compounds having aliphatic unsaturated groups therein may also be used, e.g., 6-[1-(4-formyl-2-butenyl)]-2-naphthaldehyde, etc.

Trivalent phosphorus esters which are generally useful with the aldehyde compounds and arsenic halides described above are either simple or mixed phosphites, phosphonites and phosphinites having at least one alkoxy or haloalkoxy radical of from 1 to 12 carbon atoms attached to the phosphorus atom. Examples of useful phosphite compounds are trimethyl, triethyl, triisopropyl, tri-n-propyl, tri-n-butyl, tri-tert-amyl, tri-n-hexyl, tri-n-heptyl, tris-(2-ethylhexyl), tri-n-octyl, trinonyl, tridecyl, triundecyl, tri-tert-dodecyl, amyl diethyl, butyl di-n-propyl, n-dodecyl dimethyl, ethyl allyl propyl, tris(2-chloroethyl), tris(3 - chloropropyl), tris(2 - chloropropyl), tris (3, 4-dichlorobutyl), tris(2-bromoethyl), tris(2-fluoroethyl), tris(dichlorododecyl), 2 - chloroethyl diethyl, 3-bromopropyl bis(2 - chloroethyl), diamyl trichlorooctyl, 2-chloroethyl 3-chloropropyl 4-chlorobutyl, 2-chloroethyl methyl propyl, tris(2,3-dichloropropyl), diphenyl methyl, di(p-tolyl) ethyl, and di(α-naphthyl) 2-chloroethyl phosphites. Examples of phosphonite compounds are dimethyl methylphosphonite, di-n-propyl propylphosphonite, diethyl amylphosphonite, ethyl octyl propylphosphonite, bis(2-chloroethyl) propylphosphonite, dinonyl methylphosphonite, 2-chloroethyl butyl propylphosphonite, dibutyl phenylphosphonite and diethyl benzylphosphonite. Examples of phosphinite compounds are methyl dimethylphosphinite, isopropyl diethylphosphinite, n-hexyl n-hexyloctylphosphinite, 2-chloroamyl diethylphosphinite, ethyl octylpropylphosphinite, propyl methylethylphosphinite, methyl diphenylphosphinite and butyl phenylbenzylphosphinite. Mixtures of phosphite, phosphonite and phosphinite esters may also be used.

According to this method of the invention, the aldehyde compound and the trivalent phosphorus ester are preferably reacted with the arsenic halide reactant in approximately stoichiometric proportions. For example, when acetaldehyde, arsenic trichloride, and a trialkyl or tris(haloalkyl) phosphite are contacted in a 1:1:1 molar proportion of each reactant, the product obtained is a 1-(dialkoxyphosphinyl)ethyl dichloroarsenite when the trialkyl phosphite is used, and a 1-[bis(haloalkoxy) phosphinyl]ethyl dichloroarsenite when the tris(haloalkyl) phosphite is used. When the aldehyde used is formaldehyde, the arsenic halide is arsenic tribromide, and the trivalent phosphorus ester is dihexyl hexylphosphonite and the three reactants are contacted in a 2:1:2 molar proportion, respectively, the resulting product is bis[(hexyloxyhexylphosphinyl)methyl] bromoarsenite. Similarly, when benzaldehyde, arsenic trichloride, and propyl dipropylphosphinite are contacted in 3:1:3 molar proportions respectively, the resulting product is tris[α-(dipropylphosphinyl)benzyl] arsenite.

Arsenic tribromide and trichloride react with three molar equivalents each of aldehydes and trivalent phosphorus esters to give tris(phosphinylhydrocarbyl) arsenites, i.e., compounds of the formula

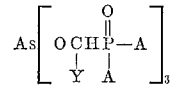

where A and Y are as defined above. A few examples of compounds of this type where the aldehyde is a monoaldehyde and the trivalent phosphorus ester is a trialkyl or tris(haloalkyl) phosphinite, a dialkyl haloalkyl phosphite, or a phosphite having three different alkyl radicals are, e.g.

Tris[1-(dimethoxyphosphinyl)ethyl]arsenite,
Tris[1-(dihexyloxyphosphinyl)undecyl]arsenite,
Tris[1-(diundecyloxyphosphinyl)-2-ethylhexyl] arsenite,
Tris{1-[bis(2-bromopropoxy)phosphinyl]propyl} arsenite,
Tris{1-[bis(10,12-dichlorododecyloxy)phosphinyl] dodecyl}arsenite,
Tris[1-(hexyloxyethoxyphosphinyl)butyl] arsenite, and
Tris[1-(2-chloropropoxyoctyloxyphosphinyl)hexadecyl] arsenite.

Examples of tris(phosphinylhydrocarbyl) arsenites obtained when the arsenic trihalide is reacted with monoaldehydes having other functional groups therein and trivalent phosphonite esters are:

Tris[1-(butylbutoxyphosphinyl)-2-chloropropyl]arsenite,
Tris[1-(hexylphenoxyphosphinyl)-4-propylthiobutyl] arsenite,
Tris[1-(octyloctyloxyphosphinyl)-6-carbopropoxyhexyl] arsenite,
Tris[α-(ethyl-2-phenylethoxyphosphinyl)furfuryl] arsenite, Tris[α-(phenyl-2,4-dichlorophenoxyphosphinyl)thenyl] arsenite,
Tris[1-(phenylpropoxyphosphinyl)-3-butenyl]arsenite,
Tris[1-(butenylbutenyloxyphosphinyl)-6-octynyl] arsenite,
Tris[1-(cyclohexylhexyloxyphosphinyl)benzyl]arsenite, and
Tris[1-(ethylethoxyphosphinyl)hexyl]arsenite.

Examples of compounds resulting from the reaction of arsenic trichloride or tribromide, a monoaldehyde, and a phosphinite ester where all three of the halogen atoms attached to the arsenic are replaced are:

Tris[1-(diheptylphosphinyl)ethyl]arsenite,
Tris[1-(hexylphenylphosphinyl)dodecyl]arsenite,
Tris[α-(propylethylphosphinyl)furfuryl]arsenite, and
Tris[1-(di-p-tolylphosphinyl)pentyl]arsenite.

The same principle applies when other aldehydes and trivalent phosphorus esters are reacted with other arsenic halide compounds. For example, when one mole of an arsenic halide reactant such as 4-chlorohexyloxydichloroarsine is reacted with one mole each of butyraldehyde and tris(2-chloropropyl) phosphite the product obtained is 1-[bis(2-chloropropoxy)phosphinyl]butyl 4-chlorohexyl chloroarsenite,

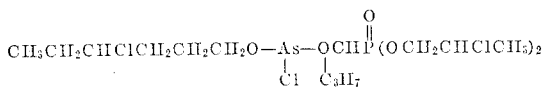

Examples of other compounds produced by replacing one or two halogen atoms from arsenic halide reactants having one or two of the arsenic valences satisfied by hydrocarbyl, hydrocarbyloxyl, hydrocarbylthio radicals or those radicals having halogen atoms therein are:

[1-(dihexylphosphinyl)pentadecyloxy]ethylchloroarsine,
Bis{1-[(2-chloropropoxy)phenoxyphosphinyl]hexyl}2-chlorobutyl arsenite,
1-(phenoxyphenylphosphinyl)naphthyl 2-chloroethyl chloroarsenite,
(Octylthio)bis{1-[bis(4-bromobutoxy)phosphinyl]heptyl} arsenite,
1-(diethoxyphosphinyl)octadecenyl 4-bromodecyl bromoarsenite,
Bis{α-[bis(2-propenyloxy)phosphinyl]benzyloxy}-2-chloropropylarsine,
(2-chloropropylthio) α-[bis(2-chloropropoxy)phosphinyl]furfuryl chloroarsenite,
{α-[Bis(2-hexynyloxy)phosphinyl]thenyl}6-bromohexyl bromoarsenite, and
Bis[1-(diphenylphosphinyl)propoxy]arsine.

Examples of products obtained by reaction of dichloro- and dibromoarsine, aldehydes, and phosphite, phosphonite, and phosphinite esters which have benzenoid radicals attached to the phosphorus atoms are:

1-(ethoxyphenylphosphinyl)propyl ethyl chloroarsenite,
Bis{1-[bis(2-phenylethoxy)phosphinyl]ethyl}4-bromobutyl arsenite,
1-(p-tolyloxy-p-tolylphosphinyl)heptyl amyl bromoarsenite,
Bis{[bis(2-chloro-1-naphthyl)phosphinyl]methyl}phenyl arsenite, and
α-(Diphenylphosphinyl)benzyl 2-chlorophenyl chloroarsenite.

By treating dibromo- or dichloroarsine compounds with a monoaldehyde and a trivalent phosphorus ester in the molar proportion of 1:2:2, respectively, products of the formula

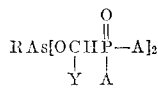

where A, R, and Y are as defined above, are prepared.

Similarly, by treating dibromo- or dichloroarsines with monoaldehydic compounds and trivalent phosphorus esters in the molar proportion of 1:1:1, respectively, products of the formula

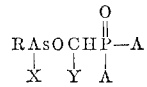

where A, R, X, and Y are as above defined, are prepared. Examples of such compounds are:

1-(diethoxyphosphinyl)butyl 4-decynyl chloroarsenite,
α-[Bis(diphenoxyphosphinyl)thenyl dodecyloxy bromoarsenite,
1-(propylpropoxyphosphinyl)nonyl ethylthio chloroarsenite,
α-(Dihexylphosphinyl)furfuryl 6-chlorohexyl chloroarsenite, and
1-[bis(4-chlorophenyl)phosphinyl]-4-hexenyl allyl bromoarsenite.

Examples of products obtained when a monochloro- or monobromoarsine compound having the remaining arsenic valences satisfied by R groups are reacted with an aldehyde, and an alkyl or haloalkyl trivalent phosphorus ester are:

1-(diethoxyphosphinyl)ethyldimethylarsine,
[α-(Dipropoxyphosphinyl)benzyl]chloromethyl methyl arsenite,
1-[bis(2-bromohexyloxy)phosphinyl]butyl 2-naphthyl ethyl arsenite,
1-(dodecyloxydodecylphosphinyl)decyl dibenzyl arsenite, and
[1-(2-bromopropoxy-2-chloropropoxy)phosphinyl]-8-butylthiooctyloxy diethyl thioarsenite.

Examples of products obtained when a monochloro- or monobromoarsine compound having each of the remaining valences of the arsine atom satisfied by an R group react with an aldehyde and a phosphite, phosphonite, or phosphinite having one or two aromatic radicals attached to the phosphorus atom are:

1-(methoxyphenylphosphinyl)ethyl bis(2-chloropropyl) arsenite,
1-[bis(4-chlorophenyl)phosphinyl]tridecyloxy diundecyl thioarsenite,
1-[(2,4-xylyloxy-2,4-xylylphosphinyl)nonyl]diphenyl arsenite,
α-[(4-bromophenoxyl-4-bromophenylphosphinyl) furfuryl]propyl phenyl arsenite, and
{1-(methoxyphenylphosphinyl)-2-propenyloxy}arsine.

When cyclic arsenic compounds having a bromine or chlorine attached to the arsenic atom are used as the arsenic halide reactant in preparing the compounds of this invention the same principle as is illustrated above applies so that there is formed a cyclic compound of arsenic having a phosphinylhydrocarbyloxy radical attached to the arsenic atom. A few examples of products obtained when the ring structure is composed of arsenic and carbon are:

1-[1-(diethoxyphosphinyl)ethoxy]-5,5-diethylarsenidine,
1-{α-[bis(2-chloropropoxy)phosphinyl]thenoxy}arsenole,
1-[1-(phenylphenoxyphosphinyl)-4-iodohexyloxy]-3,4-dimethylarsenolidine,
1-[α-(didodecylphosphinyl)naphthoxy]arsenidine,
1-{α-[bis(4-chlorophenoxy)phosphinyl]-3-methylthenoxy}arsenidine,
1-[1-(heptylethoxyphosphinyl)octyl]arsenaphthalene, etc.

Examples of products obtained when a cyclic arsenic compound containing oxygen in the ring structure and having a bromine or chlorine atom attached to the arsenic atom is used as the arsenic halide reactant are:

2-{α-[(4-methylphenoxy)(2-ethylhexyloxy)phosphinyl] benzyloxy}-1,1,3,2-dioxarsane, 2-[1(dipropoxyphosphinyl)-6-cyanohexyloxy]-4,5-dimethyl-1,3,2-dioxasolane,
2-{1-[(4-chlorophenoxy)(2-chloropropyl)phosphinyl]-3-carbopropoxypropoxy}-1,3,2-dioxarsolane,
2-[α-(octyldecylphosphinyl)-3-chlorofurfuryloxy]-1,3,2-dioxarsolane.

Examples of phosphinylhydrocarbyloxy arsenic compounds obtained when spiro compounds containing arsenic and oxygen in the ring and chlorine or bromine atoms bonded to arsenic are used as the trivalent arsenic halide reactant, i.e., those derived by a reaction according to the equation

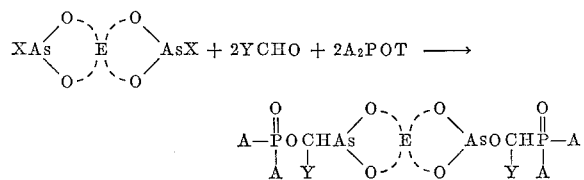

wherein X, E, Y, A, and T are as defined above are:

3,9-bis{1-[bis-(2-chloroethoxy)phosphinyl]tridecyloxy}-3,9-diarsena-2,4,8,0-tetratoxaspiro[5.5]hendecane,
2,6-bis α-(ethylphenoxyphosphinyl)benzyloxy]-2,6-diarsena-1,3,5,7-tetroxaspiro[3.3]heptane.

Aldehydes having various substituents may be used in the reaction with the arsenic halide and trivalent phosphorus ester to prepare compounds within the scope of this invention. For example, when the trivalent phosphorus ester used is triethyl phosphite and the arsenic halide used is bis(2-chloropropyl)chloroarsenite, there are obtained with the substituted aliphatic aldehydes shown below, 1-(diethoxyphosphinyl)-D bis (2-chloropropyl) arsenite where —D represents the substituted hydrocarbyloxy radical derived from the given aldehyde:

Aldehyde: —D—
2,3 - dichloropropionaldehyde _____ 2,3-dichloropropyl.
4-cyanobutyraldehyde _____ 4-cyanobutyl.
3-ethylthiopropionaldehyde _ 3-ethylthiopropyl.
8-methoxyoctanal _____ 8-methoxyoctyl.
10-fluorodecanal _____ 10-fluorodecyl.
Phenoxyacetaldehyde _____ 2-phenoxyethyl.
2-chlorobenzaldehyde _____ 2-chlorobenzyl.
2-hexenal _____ 2-hexenyl.
p-cyanobenzaldehyde _____ p-Cyanobenzyl.
m - (Methylthio)benzaldehyde _____ m-(Methylthio)benzyl.
2-ethylhexaldehyde _____ 2-ethylhexyl.
o-methylbenzaldehyde _____ o-methylbenzyl.
5-propyl-2-furaldehyde ____ 5-propyl-α-furfuryl.
5-methoxy-2 - thiophenecarboxaldehyde _____ 5-methoxy-α-thenyl.
4-carboethoxybutyraldehyde 4-carboethoxybutyl.

Examples of products obtained when a monobromo or monochloro trivalent arsenic compound and a trivalent phosphorus ester are reacted with a dialdehyde compound are:

α,α'-Bis(diethoxyphosphinyl)-p-xylylenyl α,α'-bis-(dimethylarsinite),
α,α'-Bis[bis(2-chloropropoxy)phosphinyl]-p-xylylenyl α,α'-bis(dimethyl arsenite),
2,2'-[1,4-bis(hexyloxyhexylphosphinyl)naphthalenoxy]-bis(5,5-dimethyl-1,3,2-dioxarsane),
1,8-bis(phenylethoxyphosphinyl)octylenyl 1,8-bis-(dimethyl arsenite),
1,12-bis(dipropylphosphinyl)dodecylenyl 1,12-bis(ethyl ethylarsonite),
1,4-bis[bis(2-ethylhexyloxy)phosphinyl]butylenyloxy 1,4-bis(4-ethyl-1,3,2-dioxarsolane), and
1,20-bis(phenylphenoxyphosphinyl)eicosylenyl 1,20-bis(diethylarsinite).

The presence of such substituents as the alkoxy, halogen, carboalkoxy, alkylthio, and alkyl radicals in the aldehyde constituent does not affect the reaction. Thus, when instead of an unsubstituted aliphatic aldehyde there is employed, e.g., an alkoxy substituted aldehyde such as 3-butoxybutyraldehyde, the reaction product with triethyl phosphite and bis (2-chloroethoxy)chloroarsine is 1-(diethoxyphosphinyl)-3-butoxybutyl bis(2-chloroethyl) arsenite. Similarly, when the aldehyde used is 2-chloro-1-naphthaldehyde, the product obtained with ethyl diphenylphosphinite and bis(propylthio)bromoarsine is 1-(diphenylphosphinyl)-2-chloronaphthoxy dipropyl thioarsenite.

Reaction of an arsenic compound having at least one halogen attached to the arsenic atom, an aldehyde and a trivalent phosphorus ester having at least one alkyloxy or haloalkyloxy group attached to the phosphorus atom takes place by mixing together the three reactants in the above indicated proportion at ordinary, decreased, or increased temperature and allowing the resulting reaction mixture to stand until formation of the phosphinylhydrocarbyloxy substituted arsenic compound is complete. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the phosphorus ester, is increased. Also, when the aldehyde is either a higher alkanecarboxaldehyde or an arylalkyl or alkaryl aldehyde, reaction is generally not as rapid as it is with lower aliphatic aldehydes or benzaldehyde. It is thus recommended that with each initial run, the three reactants be mixed gradually at low temperature and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction in any event, can be readily ascertained by noting cessation in change of viscosity, refractive index, or by the quantity of by-product alkyl or haloalkyl halide produced. Using the lower alkanecarboxaldehydes, which aldehydes are generally very reactive, external cooling is usually advantageous. When working with such aldehydes optimum conditions comprise gradual addition of a mixture of the aldehyde and trivalent phosphorus ester to the arsenic halogen compound with application of external cooling and thorough stirring. Usually it suffices to maintain the reaction temperature at, say, from —30 to 50° C. during addition of the aldehyde and phosphorus ester. When all of the mixture has been added to the arsenic halide, and there is no longer any evidence of exothermic reaction, completion of the reaction may be assured by heating the reaction mixture to a temperature of from, say, 50° C. to 150° C. With the more sluggish aldehydes, e.g., 2-phenylacetaldehyde, it may be necessary to heat the reaction mixture moderately, say, to a temperature of 50° C. before an exothermic reaction is started. Employing naphthaldehyde as the aldehyde reactant and a high molecular weight trivalent phosphorus ester and an arsenic-halogen compound, even higher temperatures may be required, e.g., temperatures of from 100° C. to 150° C. appear to give the best results. When it is desired to replace only part of the halogen atoms linked to the arsenic atom it is preferred to mix the proper proportion of reactants at low temperatures, say, —80 to 0° C. and allow the temperature to rise at a controlled rate until the reaction is completed.

The reactants are advantageously employed in stoichiometric proportions, i.e., one mole of aldehyde and one mole of the trivalent phosphorus ester per mole of halogen atom to be replaced from the arsenic atom. Thus, with an arsenic trihalide such as arsenic trichloride there are advantageously used three moles each of a monoaldehyde and a trivalent phosphorus ester if complete replacement of halogen is desired. However, if it is desired to replace only two, or one, of the halogen atoms linked to the arsenic atom in the arsenic trihalide, then only two, or one, molar equivalent, respectively, of each the aldehyde and trivalent phosphorus ester are used per mole of arsenic trihalide. With an arsenic dihalide, e.g., an alkyldichloroarsine, there are used two moles each of a monoaldehyde and a trivalent phosphorus ester if complete replacement of halogen in the alkylidichloroarsine is desired; whereas, if it is desired to replace only, say, one such halogen atom, then only one molar equivalent of aldehyde and of trivalent phosphorus ester are used. The same principle of proportioning of the reactants applies when working with monohaloarsine compounds. Said stoichiometric proportions are advantageously employed in that thereby good yields of desired product result and there arises substantially no problem of separating excess reactants. However, where it is not important to control the number of halogen atoms replaced from the arsenic atom, excess amounts of the aldehyde, phosphorus ester or the arsenic halide reactants may be employed. In such case, the excess reactants would have to be removed if a pure product were desired.

In conducting this method of preparing the compounds of this invention, the arsenic halide reactant may be added to a mixture of the aldehyde compound and the trivalent phosphorus ester, the mixture of aldehyde and phosporus ester may be added to the arsenic halide reactant, the aldehyde and phosphorus ester may be added simultaneously to the arsenic halide reactant, or the aldehyde may be added to the arsenic halide reactant first and then the trivalent phosphorus ester may be added. However trivalent phosphorus ester and the arsenic halide reactants should not be contacted except in the presence of the aldehyde reactant.

Formation of the desired product, i.e., a phosphinylhydrocarbyloxy arsenic compound, is accompanied by the formation of a halogenated alkane as a by-product. Thus, the reaction of say, dimethylchloroarsine, acetaldehyde, and triethyl phosphite gives ethyl chloride as a by-product:

$(CH_3)_2AsCl + CH_3CHO + P(OC_2H_5)_3 \longrightarrow$

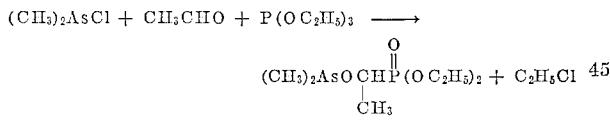

The by-product halogenated alkanes are generally articles of commerce for which many applications exist. Thus, while many currently employed processes for the manufacture of organic compounds of arsenic entail substantial waste of halogen in that by-products of little commercial importance are formed, in the present instance all of the halogen constituent of the raw materials is converted to products of economic importance.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, methylene bromide or hexane. When employing no diluent and using substantially the stoichiometric proportion of reactants, the reaction product, which consists essentially of the phosphinylhydrocarbyloxyarsenic compound dissolved in the halogentated alkane which is produced as a by-product in the reaction, may be used directly for a variety of industrial and agricultural purposes without purification.

An alternative method for the preparation of the present compounds comprises reaction of an arsenic halide, described above, with an ester of an α-hydroxyphosphonic acid, an α-hydroxyphosphinic acid, or with an α-hydroxyphosphine oxide in the presence of a basic material to remove the hydrogen halide by-product. Thus, reaction of, say, a dialkylchloroarsine with such a phosphorus compound in the presence of pyridine proceeds as follows:

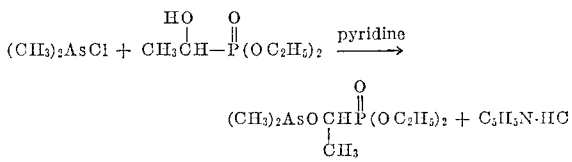

Reaction with an arsenic trihalide or dihalide results in a similar replacement of three or two halogen atoms, respectively, if stoichiometric amounts of the α-hydroxyphosphorus compound are used. The arsenic halide compound may be arsenic tribromide or trichloride, or a compound of the formula $RAsX_2$ or $R_2AsX$ where X is bromine or chlorine and each R is as defined above. The α-hydroxyphosphorus reactant may be any compound of the general formula

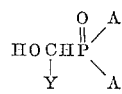

wherein Y and A are as defined above.

The compounds of this invention which have halogen atoms attached to the arsenic atom can be reacted with various chemicals to replace or relocate the halogen atoms so attached. Thus, such compounds may be reacted with alcohols or thiols to replace the halogen atoms with hydrocarbyloxy or hydrocarbylthio radicals. Particularly useful chemicals for reaction with the halogen compounds are the oxiranes and glycidyl ethers discussed above. Thus, arsenic tri- and dihalides may be treated with an aldehyde and trivalent phosphorus ester to displace part of the halogen with phosphinylhydrocarbyloxy groups, and then an epoxide may be added to displace halogen remaining attached to the arsenic atom. For example, [1-dipropoxyphosphinyl)ethoxy]methylchloroarsine reacts with, say, 1,2-epoxybutane according to the following scheme,

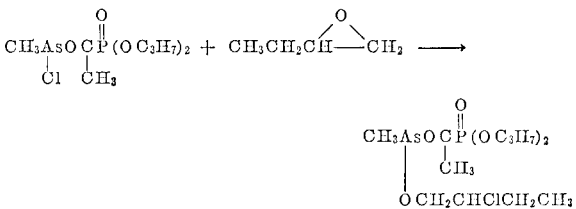

to give [1-(dipropoxyphosphinyl)ethoxy] - 2 - chlorobutoxymethylarsine.

The compounds provided by this invention are stable, usually high boiling materials which range from viscid liquids to waxy or crystalline solids. They are useful as biological toxicants, e.g., insectisides, fungicides, nematocides, and bacteriosts, as lubricant and gasoline additives, as functional fluids, e.g., in force transmission media and dielectric applications, as plasticizers for synthetic resins and plastics, and as rubber compounding chemicals. They are particularly useful as fire-retardant additives for polyurethane and polystyrene foams, for cellulosic and carbonacious combustible materials, e.g. surface coatings, lacquers, polymers, resins, adhesives, and sealing compounds. They are also useful as antioxidants and as pharmaceuticals.

*Example 1*

To a flask containing 35.5 g. (0.208 mole) of 2-chloro-1,3,2-dioxarsolane dissolved in 100 ml. of benzene there was added first, 11.0 g. (0.25 mole) of acetaldehyde, and then 36.5 g. (0.22 mole) of triethyl phosphite, the phosphite being added during 0.2 hour with cooling at 18° to 25° C. When the exothermic reaction had subsided, the reaction mixture was warmed to 61° C. to insure complete reaction. Distillation and then fractionation gave 37.8 g. of colorless liquid, B.P. 112–113° C./

0.2 mm., $n_D^{25}$ 1.4760, which was 2-[1-(diethoxyphosphinyl)ethoxy]-1,3,2-dioxarsolane,

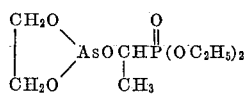

analyzing as follows:

|  | Found | Anal. calcd. for $C_8H_{18}AsO_6P$ |
|---|---|---|
| Percent C | 30.38 | 30.39 |
| Percent H | 5.77 | 5.73 |
| Percent As | 23.60 | 23.65 |
| Percent P | 9.68 | 9.79 |

The nuclear magnetic resonance chemical shift for phosphorus was −24.0 p.p.m. (relative to $H_3PO_4$). The infrared spectrum was identical to the spectrum of the product obtained by an alternate route in Example 2.

*Example 2*

This example illustrates an alternative synthesis method of preparing the compounds of this invention.

To a 1-liter, 4-necked reaction flask there was added 56.8 g. (0.334 mole) of 2-chloro-1,3,2-dioxarsolane, 60.9 g. (0.334 mole) of diethyl 1-hydroxyethylphosphonate, and 650 ml. of anhydrous ethyl ether. While cooling and stirring this mixture at 10° C. or below, 34.4 g. (0.340 mole) of triethylamine was added dropwise. After addition of the triethylamine was completed, the reaction mixture was warmed at reflux for 0.5 hour. The resulting slurry was filtered under dry nitrogen to remove the triethylamine hydrochloride. Distillation and then fractionation gave a colorless liquid, B.P. 113° C./0.2 mm., $n_D^{25}$ 1.4765, which was 2-[1-(diethoxyphosphinyl)ethoxy]-1,3,2-dioxarsolane. It had a nuclear magnetic resonance chemical shift of −24.8 p.p.m. and analyzed as follows:

|  | Found | Anal. calcd. for $C_8H_{18}AsO_6P$ |
|---|---|---|
| Percent C | 30.26 | 30.39 |
| Percent H | 5.53 | 5.73 |
| Percent As | 23.50 | 23.65 |
| Percent P | 9.71 | 9.79 |

*Example 3*

To a reaction flask containing 129.5 g. (0.78 mole) of triethyl phosphite and 43 g. (0.92 mole) of freshly distilled acetaldehyde there was added 45.3 g. (0.25 mole) of arsenic trichloride during 0.4 hour at 15° to 20° C. When the addition was completed, the reaction mixture was warmed to 75° C. to insure complete reaction and then concentrated to a temperature of 100° C./0.2 mm. There was obtained as residue 153.7 g. (99.5% of theory) of an amber liquid, $n_D^{25}$ 1.4602, having the structural formula,

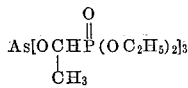

analyzing as follows:

|  | Found | Anal. calcd. for $C_{18}H_{42}AsO_{12}P_3$ |
|---|---|---|
| Percent C | 34.72 | 34.95 |
| Percent H | 7.09 | 6.85 |
| Percent As | 11.90 | 12.10 |
| Percent P | 15.24 | 15.05 |

*Example 4*

To 45.0 g. (0.270 mole) of triethyl phosphite there was added 57.6 g. (0.270 mole) of 2-chloro-5,5-dimethyl-1,3,2-dioxarsane at −7° to −10° C. Then acrolein (15.2 g., 0.270 mole) was added while cooling the mixture to keep the temperature below −10° C. When the exothermic reaction was complete, the mixture was gradually warmed, while stirring, to 70° C. After one hour at 70° C., the mixture was distilled to give a colorless liquid, B.P. 138–140° C./0.3 mm., which was 2-[1-(diethoxyphosphinyl)-2-propenyloxy]-5,5-dimethyl-1,3,2-dioxarsane,

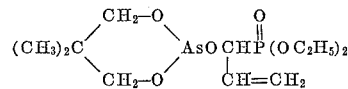

analyzing as follows:

|  | Found | Anal. calcd. for $C_{12}H_{24}AsO_6P$ |
|---|---|---|
| Percent C | 38.98 | 38.95 |
| Percent H | 6.57 | 6.54 |
| Percent As | 20.50 | 20.25 |
| Percent P | 8.26 | 8.37 |

*Example 5*

To a mixture consisting of 9.8 g. (0.592 mole) of triethyl phosphite and 3.7 g. (0.064 mole) of propionaldehyde there was added 10.0 g. (0.054 mole) of dimethylbromoarsine while cooling the mixture below 10° C. When the exothermic reaction was complete, the mixture was heated to 60° C. for 0.5 hour and then to 80° C. under vacuum to remove low boiling materials, thus giving 16.0 g. (98.7% yield) of crude 1-(diethoxyphosphinyl)propoxydimethylarsine. Distillation gave a colorless liquid, B.P. 89–90° C./0.10 mm., analyzing as follows:

|  | Found | Anal. calcd. for $C_9H_{22}AsO_4P$ |
|---|---|---|
| Percent C | 36.13 | 36.05 |
| Percent H | 7.56 | 7.38 |
| Percent As | 25.12 | 24.95 |
| Percent P | 10.50 | 10.31 |

*Example 6*

To 9.5 g. (0.056 mole) of triethyl phosphite and 5.4 g. (0.056 mole) of furfuraldehyde was added dropwise 9.5 g. (0.056 mole) of dimethylbromoarsine while cooling below 10° C. After the heat generation subsided, the mixture was warmed slowly to 60° C. while stirring. After one hour at 60° C. the reaction mixture was distilled to give a colorless liquid, B.P. 132–136° C./0.15 mm., which was [α-(diethoxyphosphinyl)furfuryloxy]dimethylarsine, analyzing as follows:

|  | Found | Anal. Calcd. for $C_{11}H_{20}AsO_5P$ |
|---|---|---|
| Percent C | 39.37 | 39.10 |
| Percent H | 5.88 | 5.95 |
| Percent As | 22.24 | 22.15 |
| Percent P | 9.36 | 9.16 |

*Example 7*

To a mixture consisting of 38.3 g. (0.230 mole) of triethyl phosphite and 27.7 g. (0.230 mole) of p-tolualdehyde there was added dropwise while cooling and stirring 49.0 g. of 2-chloro-5,5-dimethyl-1,3,2-dioxarsane. Upon completion of the exothermic reaction, the reaction mixture was slowly heated to 95° C. and then concentrated to 150° C./1.0 mm. to give 75 g. of 2-[α-(diethoxyphosphinyl)-p-methylbenzyloxy] - 5,5 - dimethyl - 1,3,2-dioxarsane,

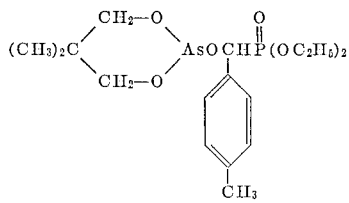

analyzing as follows:

|           | Found | Anal. Calcd. for $C_{17}H_{28}AsO_6P$ |
|-----------|-------|--------------------------------------|
| Percent C | 46.18 | 47.00 |
| Percent H | 6.24  | 6.50  |
| Percent As| 17.02 | 17.23 |
| Percent P | 7.88  | 7.13  |

*Example 8*

To a reaction flask containing 38.0 g. (0.228 mole) of triethyl phosphite and 28.4 g. (0.228 mole) of 6-methyl-3-cyclohexenecarboxaldehyde there was added 48.5 g. (0.228 mole) of 2-chloro-5,5-dimethyl-1,3,2-dioxarsane while cooling to keep the reaction temperature near 10° C. When the addition was completed, the reaction mixture was heated gradually to 95° C. to insure complete reaction. Low boiling volatiles were removed by heating the mixture under vacuum to 155° C./0.8 mm. There was obtained as residue 81.7 g. of 2-[α-(diethoxyphosphinyl) - 6-methyl-3-cyclohexenylmethoxy]-5,5-dimethyl-1,3,2-dioxarsane,

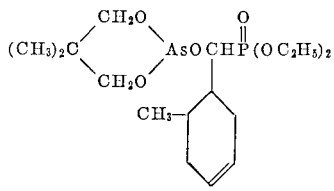

analyzing as follows:

|           | Found | Anal. Calcd. for $C_{17}H_{32}AsO_6P$ |
|-----------|-------|--------------------------------------|
| Percent C | 46.27 | 46.70 |
| Percent H | 7.39  | 7.37  |
| Percent As| 16.97 | 17.10 |
| Percent P | 7.24  | 7.08  |

*Example 9*

To a mixture consisting of 37.0 g. (0.222 mole) of triethyl phosphite and 30.3 g. (0.222 mole) of p-anisaldehyde there was added dropwise 47.3 g. of 2-chloro-5,5-dimethyl-1,3,2-dioxarsane while cooling to control the exothermic reaction. The mixture was warmed to room temperature, heated at 80° C. to 90° C. for one hour and then concentrated to 150° C./0.13 mm. There was thus obtained 80.1 g. of 2-[α-(diethoxyphosphinyl)-p-methoxybenzyloxy]-5,5-dimethyl-1,3,2-dioxarsane

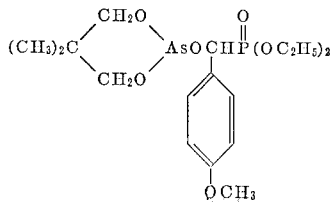

analyzing as follows:

|           | Found | Anal. Calcd. for $C_{17}H_{28}AsO_7P$ |
|-----------|-------|--------------------------------------|
| Percent C | 45.47 | 45.40 |
| Percent H | 6.31  | 6.27  |
| Percent As| 16.75 | 16.63 |
| Percent P | 7.12  | 6.88  |

*Example 10*

While maintaining the reaction temperature between 10° C. and 13° C., there was added dropwise 28.6 g. (0.1345 mole) of 2-chloro-5,5-dimethyl-1,3,2-dioxarsane to a mixture of 22.4 g. (0.134 mole) of triethyl phosphite and 17.5 g. (0.134 mole) of ethyl 3-formylpropionate. When the addition was complete, the temperature of the mixture was raised gradually to 75° C. in about 1 hour to insure complete reaction. The mixture was then heated under vacuum to 155° C./0.4 mm. There was thus obtained 2-[1-(diethoxyphosphinyl)-3-carboethoxypropoxy]-5,5-dimethyl-1,3,2-dioxarsane,

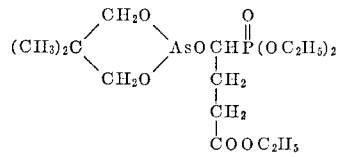

*Example 11*

Triethyl phosphite (36.6 g., 0.220 mole), o-chlorobenzaldehyde (31.0 g., 0.221 mole), and 2-chloro-5,5-dimethyl-1,3,2-dioxarsane (46.8 g., 0.220 mole) reacted under substantially the same conditions as recited in Example 10 to give 86.7 g. of 2-[α-(diethoxyphosphinyl)-2-chlorobenzyloxy]-5,5-dimethyl-1,3,2-dioxarsane,

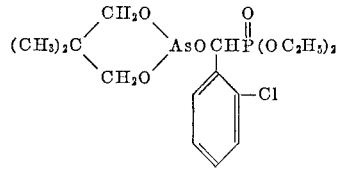

analyzing as follows:

|            | Found | Anal. Calcd. for $C_{16}H_{25}AsClO_6P$ |
|------------|-------|----------------------------------------|
| Percent C  | 42.73 | 42.30 |
| Percent H  | 5.39  | 5.54  |
| Percent As | 16.40 | 16.48 |
| Percent P  | 7.11  | 6.82  |
| Percent Cl | 8.37  | 7.80  |

*Example 12*

To a reaction flask containing 40.5 g. (0.244 mole) of triethyl phosphite and 23.5 g. (0.244 mole) of freshly distilled furfuraldehyde there was added 51.9 g. (0.244 mole) of 2-chloro-5,5-dimethyl-1,3,2-dioxarsane while cooling to keep the temperature of the reaction mixture below 10° C. Upon completion of the exothermic reaction, the mixture was slowly heated to 75° C. to insure complete reaction. The mixture was then heated to 155° C./1.0 mm. to give as residue 92.6 g. of 2-[α-(diethoxyphosphinyl) furfuryloxy]-5,5-dimethyl-1,3,2-dioxarsane

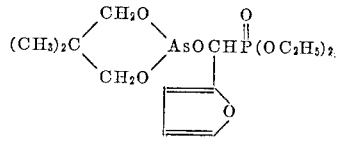

21 analyzing as follows:

|  | Found | Anal. Calcd. for $C_{14}H_{24}AsO_7P$ |
|---|---|---|
| Percent C | 40.82 | 41.00 |
| Percent H | 5.91 | 5.90 |
| Percent As | 18.08 | 18.27 |
| Percent P | 7.71 | 7.56 |

Example 13

To a mixture consisting of 48.3 g. (0.290 mole) of triethyl phosphite and 12.8 (0.290 mole) of acetaldehyde there was added dropwise 59.3 g. (0.279 mole) of 2-chloro-5,5-dimethyl-1,3,2-dioxarsane with cooling to keep the mixture at 15° to 20° C. After addition was completed, the mixture was stirred at room temperature for one half hour and then heated to 60° C. to insure complete reaction. Concentration to 142° C./1 mm. gave 90.4 g. of a colorless liquid, 2-[1-(diethoxyphosphinyl)ethoxy]-5,5-dimethyl-1,3,2-dioxarsane

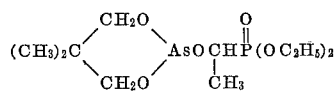

analyzing as follows:

|  | Found | Anal. Calcd. for $C_{11}H_{24}AsO_6P$ |
|---|---|---|
| Percent C | 36.90 | 36.85 |
| Percent H | 6.94 | 6.74 |
| Percent As | 20.82 | 20.85 |
| Percent P | 8.46 | 8.64 |

Example 14

Tris(2-chloropropyl)phosphite (66.4 g., 0.213 mole) and 12.4 g. (0.213 mole) of propionaldehyde were mixed and maintained at room temperature while 45.4 g. (0.213 mole) of 2-chloro-5,5-dimethyl-1,3,2-dioxarsane was added dropwise. Only mild cooling was necessary. After completion of the addition of the arsenic compound, the mixture was heated to 70° C. for three hours and then heated under vacuum to 155°/0.2 mm. to remove low boiling materials. There was obtained 66.7 g. of 2-{1-[bis(2-chloropropoxy)phosphinyl]propoxy}-5,5-dimethyl-1,3,2-dioxarsane

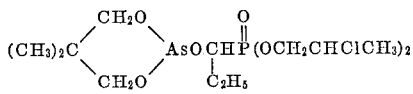

Example 15

Methylarsinedibromide (11.6 g., 0.047 mole) was added slowly under nitrogen to a mixture of 16.4 g. (0.098 mole) of triethyl phosphite and 6.0 g. (0.103 mole) of propionaldehyde with cooling below 10° C. When the exothermic reaction was complete the temperature was raised gradually until a second exothermic reaction set in at 15° to 18° C. Cooling was used to maintain this temperature during reaction. The mixture was then heated to 70° C. and finally concentrated to 120° C./0.18 mm. to remove low boiling materials. There was obtained as residue 21.6 g. (96% of theory) of substantially pure bis[1-(diethoxyphosphinyl)propoxy]methylarsine,

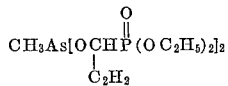

22 analyzing as follows:

|  | Found | Anal. Calcd. for $C_{15}H_{35}AsO_8P_2$ |
|---|---|---|
| Percent C | 37.79 | 37.65 |
| Percent H | 7.38 | 7.35 |
| Percent As | 15.82 | 15.60 |
| Percent P | 13.13 | 12.90 |

Example 16

To a solution consisting of 36.4 g. (0.293 mole) of trimethyl phosphite and 19.7 g. (0.146 mole) of terephthalaldehyde in 100 ml. of methylene chloride there was added dropwise 62.3 g. (0.293 mole) of 2-chloro-5,5-dimethyl-1,3,2-dioxarsane while cooling to keep the temperature of the reaction mixture between 20° and 25° C. The mixture was stirred for a short time then heated at reflux for 2 hours. Concentration to 146° C./0.25 mm. gave 89.4 g. of crude, viscous α,α'-bis(dimethoxyphosphinyl)-p-xylylenyldioxy-α,α' - bis(5,5-dimethyl-1,3,2-dioxarsane),

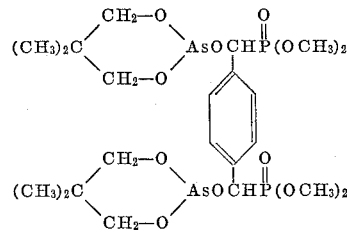

Example 17

Vinyldibromoarsine (18.6 g., 0.071 mole) was added slowly to a mixture of 24.5 g. (0.147 mole) of triethyl phosphite and 8.9 g. of propionaldehyde while cooling to control the exothermic reaction. The mixture was then heated to 60° C. to insure complete reaction and finally concentrated to 125° C./0.26 mm. to remove low boiling materials. There was obtained as residue 32.0 g. of bis[1-(diethoxyphosphinyl)propyl]vinylarsine analyzing as follows:

|  | Found | Anal. Calcd. for $C_{16}H_{35}AsO_8P_2$ |
|---|---|---|
| Percent C | 38.95 | 39.15 |
| Percent H | 7.29 | 7.18 |
| Percent As | 15.25 | 15.25 |
| Percent P | 12.82 | 12.60 |

Example 18

To a mixture consisting of 44.0 g. (0.264 mole) of triethyl phosphite and 28.1 g. (0.264 mole) of benzaldehyde there was added dropwise, while cooling to keep the temperature below 15° C., a solution of 45.1 g. of 2-chloro-1,3,2-dioxarsolane in 60 ml. of methylene chloride. When the exothermic reaction was complete, the reaction mixture was warmed for an hour at 45° C. to insure complete reaction. Methylene chloride and other low boiling materials were removed by heating the mixture to 70° C. and finally to 155° C./0.3 mm. The product residue was 2-[α-(diethoxyphosphinyl)benzyloxy]-1,3,2-dioxarsolane,

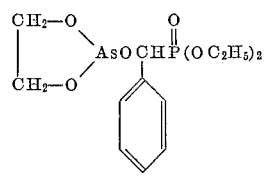

Example 19

Diethyl phenylphosphonite (0.28 mole) and 0.30 mole of acetaldehyde were placed in a flask and cooled below —15° C. as 0.20 mole of 2-chloro-5,5-dimethyl-1,3,2-dioxarsane was added. The mixture was heated to 75° C. to insure complete reaction and then concentrated to 140° C./1.2 mm. to give 102.6 g. of 2-[1-(phenylethoxyphosphinyl)ethoxy]-5,5-dimethyl-1,3,2-dioxarsane,

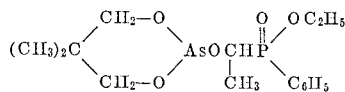

analyzing as follows:

|  | Found | Anal. Calcd. for $C_{15}H_{21}AsO_5P$ |
|---|---|---|
| Percent C | 46.53 | 46.20 |
| Percent H | 6.35 | 6.20 |
| Percent As | 20.00 | 19.20 |
| Percent P | 7.77 | 7.95 |

*Example 20*

To a mixture consisting of 92 g. (0.275 mole) of trihexyl phosphite and 35.3 g. (0.275 mole) of 2-ethylhexaldehyde there was added dropwise 25.7 g. (0.134 mole) of ethoxydichloroarsine while cooling to keep the temperature below about 12° C. After about two-thirds of the ethoxydichloroarsine had been added, the mixture was gradually warmed to about 15° C. At this temperature a second exothermic reaction was initiated. Cooling was used to keep the temperature below 20° C. The reaction mixture was then heated to 70° C. to insure complete reaction, and it was finally concentrated to 117° C. under vacuum to remove low boiling materials. There was obtained as residue 111 g. of substantially pure ethyl bis[1-(dihexyloxyphosphinyl)-2-ethylhexyl] arsenite,

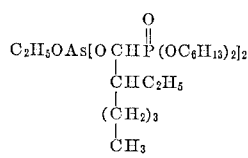

*Example 21*

To a flask containing 49.5 g. (0.14 mole) of 3,9-dichloro-3,9-diarsena-2,4,8,10-tetroxaspiro[5.5]hendecane dissolved in 300 ml. of methylene chloride there was added portion-wise a mixture of 36 g. (0.29 mole) of trimethyl phosphite and 30.8 g. (0.29 mole) of benzaldehyde. The temperature increased from 15° to 35° C. during the addition. The mixture was stirred for 1 hour and then warmed at reflux for one-half hour. The reaction mixture was distilled to a pot temperature of 95° C. to insure complete reaction and to remove the solvent. The residue was concentrated to 120° C./0.2 mm., and there was thus obtained as a viscous liquid 98.0 g. (98% of theory) of substantially pure 3,9-bis[α-(dimethoxyphosphinyl)benzyloxy]-3,9-diarsena-2,4,8,10-tetroxaspiro-[5.5]hendecane,

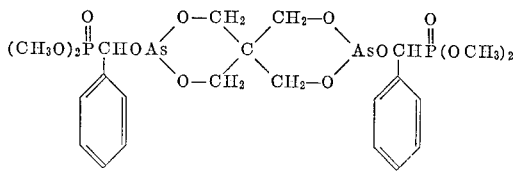

analyzing as follows:

|  | Found | Anal. Calcd. for $C_{23}H_{32}As_2O_{12}P_2$ |
|---|---|---|
| Percent C | 38.33 | 38.83 |
| Percent H | 5.03 | 4.53 |
| Percent As | 21.85 | 21.05 |
| Percent P | 8.77 | 8.71 |

*Example 22*

Freshly distilled arsenic trichloride (58.7 g., 0.324 mole) was added dropwise to a mixture of 122 g. (1.172 mole) of β-methylmercaptopropionaldehyde and 164 g. (0.985 mole) of triethyl phosphite cooled at 10° C. to 15° C. Upon completing the addition of the arsenic trichloride, the mixture was allowed to warm gradually and was finally heated to 100° C. at atmospheric pressure. Concentration to a temperature of 115° C. at reduced pressure gave as residue 264.2 g. of tris[1-(diethoxyphosphinyl)-3-methylmercaptopropyl] arsenite,

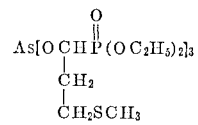

analyzing as follows:

|  | Found | Anal. Calcd. for $C_{21}H_{51}AsO_{12}P_3S_3$ |
|---|---|---|
| Percent C | 36.20 | 36.05 |
| Percent H | 6.99 | 6.80 |
| Percent As | 9.14 | 9.38 |
| Percent P | 11.75 | 11.61 |
| Percent S | 12.19 | 12.01 |

*Example 23*

Propylene oxide (11.0 g., 0.189 mole) was added dropwise to 34.3 g. (0.189 mole) of arsenic trichloride while cooling continuously to control the exothermic reaction. When the reaction was complete, the product was added to a second flask containing a mixture of 64.8 g. (0.390 mole) of triethyl phosphite and 17.2 (0.30 mole) of acetaldehyde while controlling the temperature at 10° to 15° C. When the exothermic reaction had subsided, the reaction mixture was warmed to 65° C. for 1 hour to insure complete reaction and then concentrated to 108° C./1.0 mm. to remove low boiling materials. There was obtained as liquid residue 96.0 g. (96% of theory) of bis[1-(diethoxyphosphinyl)-ethyl] 2-chloropropyl arsenite,

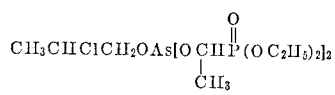

analyzing as follows:

|  | Found | Anal. Calcd. for $C_{15}H_{34}AsCl_9P_2$ |
|---|---|---|
| Percent C | 34.01 | 34.20 |
| Percent H | 6.47 | 6.50 |
| Percent As | 14.42 | 14.20 |
| Percent Cl | 6.88 | 6.73 |
| Percent P | 11.91 | 11.85 |

*Example 24*

Furfuraldehyde (17.3 g., 0.180 mole) and triethyl phosphite (30.0 g., 0.180 mole) were mixed in a reaction flask and cooled to 5° C. Arsenic trichloride was added dropwise while maintaining the temperature below 10° C. This reaction mixture was added dropwise to a second flask containing a mixture of 22.4 g. (0.180 mole) of trimethyl phosphite and 8.0 g. (0.180 mole) of acetaldehyde while cooling to keep the temperature below 10° C. When the addition was complete, the mixture was allowed to warm to 15° C. and 15.7 g. (0.271 mole) of propylene oxide was added. The mixture was warmed at 60° C. for 1.75 hours to insure complete reaction and then concentrated to 120° C./0.65 mm. to remove low boiling materials. There was obtained as a very thick liquid residue, 91.0 g. of α-(diethoxyphosphinyl)furfuryl 1-(dimethoxyphosphinyl)ethyl 2-chloropropyl arsenite,

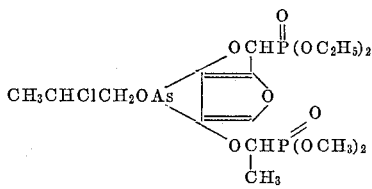

analyzing as follows:

|  | Found | Anal. Calcd. for $C_{16}H_{30}AsCl_{10}P_2$ |
|---|---|---|
| Percent C | 34.43 | 34.65 |
| Percent H | 5.54 | 5.46 |
| Percent As | 13.41 | 13.50 |
| Percent Cl | 6.59 | 6.40 |
| Percent P | 11.09 | 11.18 |

We claim:
1. Esters of trivalent arsenic acids having a generic formula selected from the group consisting of

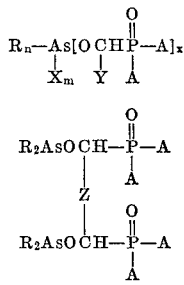

and

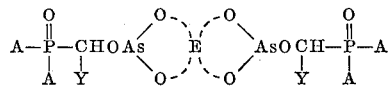

where $n$ is a whole number of from 0 to 2, $m$ is a whole number of from 0 to 2, $x$ is a whole number of from 1 to 3, and the sum total of $n+m+x$ is always equal to 3; X is selected from the group consisting of bromine and chlorine; each R is selected from the group consisting of hydrogen, hydrocarbyl, hydrocarbyloxy, hydrocarbylthio radicals having from 1 to 20 carbon atoms, and said radicals having halogen substituents therein, two R's taken together are satisfied by a member of the group consisting of (a) a bivalent -hydrocarbylene- radical having from 4 to 12 carbon atoms and completing with the arsenic atom a ring having from 4 to 6 carbon atoms, (b) a bivalent —O-hydrocarbylene-O— radical having from 2 to 12 carbon atoms and completing with the arsenic atom a ring having from 2 to 4 carbon atoms; Y is selected from the group consisting of hydrogen, hydrocarbyl radicals having from 1 to 17 carbon atoms, furyl, thienyl, and said radicals having as a substituent therein a member of the group consisting of halogen, -cyano, —O-alkyl, —S-alkyl, —COOalkyl where alkyl has from 1 to 5 carbon atoms when $x$ is 1, and when $x$ is 2 to 3, Y is selected from the group consisting of hydrogen, hydrocarbyl radicals having from 1 to 11 carbon atoms, furyl, thienyl, and said radicals having a substituent selected from the group consisting of halogen, -cyano, —O-alkyl, —S-alkyl, and —COOalkyl where -alkyl has from 1 to 5 carbon atoms; Z is a bivalent -hydrocarbylene- radical having from 1 to 18 carbon atoms; each A is selected from the group consisting of hydrocarbyl and hydrocarbyloxy radicals having from 1 to 12 carbon atoms, and said radicals having halogen substituent therein; and E contains only the elements carbon and hydrogen and is the remainder of a heterocyclic trivalent arsenic spiro compound containing from 1 to 5 carbon atoms.

2. Tris[1 - (diethoxyphosphinyl) - 3 - methylmercaptopropyl]arsenite.

3. Bis[1 - (dihexyloxyphosphinyl) - 2-ethylhexyl] ethyl arsenite.

4. 2 - [1-(diethoxyphosphinyl)ethoxy]-5,5-dimethyl-1,3,2-dioxarsane.

5. 2 - [1-(phenylethoxyphosphinyl)ethoxy]-5,5-dimethyl-1,3,2-dioxarsane.

6. 2 - {1-[bis(2-chloropropoxy)phosphinyl]propoxy}-5,5-dimethyl-1,3,2-dioxarsane.

7. [α - (Diethoxyphosphinyl)furfuryloxy]dimethylarsine.

8. Tris[1-(diethoxyphosphinyl)ethyl] arsenite.

9. The compounds having the formula

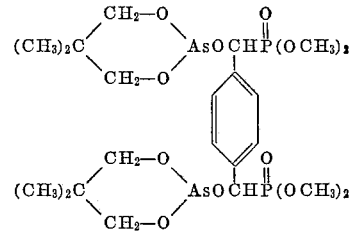

10. The method which comprises reacting a trivalent arsenic compound having a generic formula selected from the group consisting of

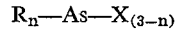

and

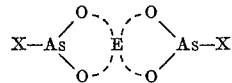

wherein $n$ is a whole number of from 0 to 2, X is selected from the group consisting of bromine and chlorine, R is selected from the group consisting of hydrogen, hydrocarbyl, hydrocarbyloxy, and hydrocarbylthio radicals having from 1 to 20 carbon atoms, and said radicals having halogen substituents therein, two R's taken together are satisfied by a member of the group consisting of (a) a bivalent -hydrocarbylene- radical having from 4 to 12 carbon atoms and completing with the arsenic atom a ring having from 4 to 6 carbon atoms, (b) a bivalent —O-hydrocarbylene—O- radical having from 2 to 12 carbon atoms and completing with the arsenic atom a ring having from 2 to 4 carbon atoms and E contains only the elements carbon and hydrogen and is the remainder of a heterocyclic trivalent arsenic spiro compound, containing from 1 to 5 carbon atoms, with an aldehyde having a generic formula selected from the group consisting of YCHO and OHC—Z—CHO wherein Y is selected from the group consisting of hydrogen, hydrocarbyl radicals having from 1 to 17 carbon atoms, furyl, thienyl, and said radicals having as substituents halogen cyano, —O-alkyl, —S-alkyl, —COOalkyl where alkyl has from 1 to 5 carbon atoms; and Z is a bivalent -hydrocarbylene- radical having from 1 to 18 carbon atoms; and a trivalent phosphorus ester having the generic formula

wherein each A is selected from the group consisting of hydrocarbyl, hydrocarbyloxy radicals having from 1 to 12 carbon atoms, and said radicals having halogen substituents therein, and T is selected from the group consisting of alkyl and haloalkyl radicals having from 1 to 12 carbon atoms.

11. The method which comprises reacting arsenic trichloride, acetaldehyde, and triethyl phosphite and recovering tris[1-diethoxyphosphinyl)ethyl] arsenite.

12. The method which comprises reacting 2-chloro-5,5-dimethyl-1,3,2-dioxarsolane, propionaldehyde and tris(2-chloropropyl) phosphite, and recovering 2-{1-[bis(2-chloropropoxy)phosphinyl]propoxy} - 5,5-dimethyl-1,3,2-dioxarsolane.

13. The method which comprises reacting an arsenic halogen compound, having a general formula selected from the group consisting of $$R_nAs\text{—}X_{(3-n)}$$

and

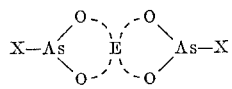

wherein X is selected from the group consisting of bromine, chlorine, and mixtures thereof, n is a whole number of from 0 to 2, R is selected from the group consisting of hydrogen, hydrocarbyl, hydrocarbyloxy, and hydrocarbylthio radicals having from 1 to 20 carbon atoms, and said radicals having halogen substituents therein, two R's taken together being satisfied by a member of the group consisting of (a) a bivalent -hydrocarbylene- radical having from 4 to 12 carbon atoms and completing with the arsenic atom a ring having from 4 to 6 carbon atoms, (b) a bivalent —O-hydrocarbylene-O— radical having from 2 to 12 carbon atoms and completing with the arsenic atom a ring having from 2 to 4 carbon atoms, and E is the remainder of a heterocylic trivalent arsenic spiro compound containing from 1 to 5 carbon atoms, with an alpha-hydroxy pentavalent phosphorus compound having the formula

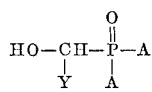

wherein Y is selected from the group consisting of hydrogen, hydrocarbyl radicals having from 1 to 17 carbon atoms, furyl, thienyl, said radicals carrying a substituent selected from the group consisting of halogen, cyano, —O-alkyl, —S-alkyl, —COOalkyl, where alkyl has from 1 to 5 carbon atoms, and

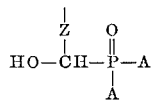

when n is 2, and when n is 0 to 1, Y is selected from the group consisting of hydrogen, hydrocarbyl radicals having from 1 to 11 carbon atoms furyl, thienyl and said radicals having as a substituent therein a member of the group consisting of halogen, -cyano, —O-alkyl, —S-alkyl, —COOalkyl where alkyl has from 1 to 5 carbon atoms;

Z is a bivalent hydrocarbylene radical having from 1 to 18 carbon atoms, and each A is selected from the group consisting of hydrocarbyl, and hydrocarbyloxy radicals having from 1 to 12 carbon atoms and said radicals having halogen substituents therein, in the presence of a basic material.

14. 3,9 - bis[α-(dimethoxyphosphinyl)benzyloxy]-3,9-diarsena-2,4,8,10-tetroxaspiro[5.5]hendecane.

15. A tris[1-(dialkoxyphosphinyl)alkyl] arsenite having from 1 to 12 carbon atoms in each alkoxy group bonded to phosphorus, and from 1 to 12 carbon atoms in each alkyl group.

16. A tris[1-(haloalkoxyalkoxyphosphinyl)alkyl] arsenite having from 1 to 12 carbon atoms in each of the haloalkoxy and alkoxy radicals bonded to phosphorus and from 1 to 12 carbon atoms in the alkyl groups.

17. The method which comprises contacting and reacting an arsenic trihalide selected from the group consisting of arsenic tribromide and arsenic trichloride, and mixtures thereof with an alkanecarboxaldehyde having from 1 to 18 carbon atoms, and a trialkyl phosphite having from 1 to 12 carbon atoms in each alkyl group, to produce as a resulting product a 1-(dialkoxyphosphinyl) alkyl arsenite ester.

References Cited by the Examiner

UNITED STATES PATENTS

| 2,312,207 | 2/1943 | Clayton et al. | 260—441 X |
| 2,346,155 | 4/1944 | Denison et al. | 260—441 X |
| 2,354,536 | 7/1944 | Nelson | 260—440 X |

FOREIGN PATENTS

Allott, Richter's Organic Chemistry, Third Edition, vol. 1 (1934), pages 114–18 and 578.

Bergmann, Chem. of Acetylene and Related Compounds, Interscience, 1948, page 80.

Fieser, Organic Chemistry, Third Edition, 1956, pages 46–7.

Ginsberg, Non - Benzenoid Aromatic Compounds (1959), pages 107 and 141–43.

Taylor, Richter's Organic Chemistry, Third Edition, vol 2 (1939), pages 77, 93, 96, 177–79 and 289 and 348.

NICHOLAS S. RIZZO, *Primary Examiner.*

ABRAHAM H. WINKELSTEIN, IRVING MARCUS, WALTER A. MODANCE, *Examiners.*